United States Patent
Jaussaud et al.

(10) Patent No.: US 6,918,948 B2
(45) Date of Patent: Jul. 19, 2005

(54) PROCESS FOR USE OF MOLECULAR SIEVE ADSORBENT BLENDS

(75) Inventors: Dave Jaussaud, Louisville, KY (US); Kerry Weston, Louisville, KY (US); Armin Pfenninger, Uetikon (CH); Beat Kleeb, Uetikon (CH)

(73) Assignee: Zeochem LLC, Louisville, KY (US)

( * ) Notice: Subject to any disclaimer, the term of this patent is extended or adjusted under 35 U.S.C. 154(b) by 0 days.

(21) Appl. No.: 10/765,018

(22) Filed: Jan. 26, 2004

(65) Prior Publication Data

US 2004/0156766 A1 Aug. 12, 2004

Related U.S. Application Data

(62) Division of application No. 10/054,041, filed on Jan. 22, 2002, now Pat. No. 6,743,745.

(51) Int. Cl.$^7$ .......................... B01D 53/02; B01D 59/26
(52) U.S. Cl. ....................... 95/116; 95/117; 95/130; 95/138; 95/139; 95/140; 95/143; 210/660; 210/689
(58) Field of Search ............................ 95/117, 139, 130, 95/138, 116, 140, 143; 210/689, 660

(56) References Cited

U.S. PATENT DOCUMENTS

| | | | |
|---|---|---|---|
| 2,973,327 A | 2/1961 | Moore | |
| 3,049,449 A | * 8/1962 | Allegrini | 502/80 |
| 3,219,590 A | 11/1965 | Riband | |
| 4,420,419 A | 12/1983 | Ogawa | |
| 5,001,098 A | 3/1991 | Pacaud | |
| 5,173,462 A | 12/1992 | Plee | |
| 5,292,360 A | 3/1994 | Pacaud | |
| 5,316,993 A | 5/1994 | Kleinschmit | |
| 5,413,978 A | 5/1995 | Kramer | |
| 5,468,700 A | * 11/1995 | Ward | 502/60 |
| 5,493,821 A | * 2/1996 | Cohen et al. | 52/171.3 |
| 5,883,034 A | * 3/1999 | Drake et al. | 502/68 |
| 5,948,726 A | 9/1999 | Kepner | |
| 6,130,179 A | 10/2000 | Parker | |
| 6,183,539 B1 | 2/2001 | Tsybulevskiy | |
| 6,444,601 B1 | * 9/2002 | Purcell et al. | 502/62 |
| 6,743,745 B2 | * 6/2004 | Jaussaud et al. | 502/68 |
| 2003/0051673 A1 | * 3/2003 | Raymond et al. | 119/171 |

FOREIGN PATENT DOCUMENTS

| | | |
|---|---|---|
| EP | 0519073 | 12/1992 |
| EP | 0826631 | 8/1997 |
| EP | 0940174 A2 | 9/1999 |
| FR | 2678525 | 1/1993 |
| GB | 827043 | 11/1957 |
| JP | 5147926 | 6/1993 |
| JP | 11246214 | 9/1999 |
| WO | WO0001478 | 1/2000 |

* cited by examiner

Primary Examiner—Christina Johnson
(74) Attorney, Agent, or Firm—Scott R. Cox

(57) ABSTRACT

A Process for the production and uses of a molecular sieve adsorbent blend product with improved performance characteristics produced by preparing a zeolite powder, preparing a highly dispersed attapulgite fiber binder, mixing the zeolite powder with the highly dispersed attapulgite binder to form a mixture, forming molecular sieve adsorbent products into a shaped material and calcining the shaped material, wherein the tapped bulk density of the highly dispersed attapulgite fibers measured according to DIN/ISO 787 is more than about 550 g/ml.

18 Claims, No Drawings

PROCESS FOR USE OF MOLECULAR SIEVE ADSORBENT BLENDS

CROSS REFERENCE TO RELATED APPLICATIONS

This application is a divisional application based on application Ser. No. 10/054,041, filed on Jan. 22, 2002 now U.S. Pat. No. 6,743,745.

BACKGROUND OF INVENTION

1. Field of Invention

This invention relates to molecular sieve adsorbents and more particularly to processes of use of a molecular sieve adsorbent blend comprising a zeolite and a highly dispersed attapulgite binder. This invention also relates to processes of use of molecular sieve adsorbent blends prepared by the process of blending a zeolite with a highly dispersed attapulgite binder.

2. Background Art

Zeolites are hydrated metal alumino silicates having the general formula $$M_{2/n}O:Al_2O_3:xSiO_2:yH_2O$$

where M usually represents a metal of the alkali or alkaline earth group, n is the valence of the metal M, x varies from 2 to infinity, depending on the zeolite structure type and y designates the hydrated status of the zeolite. Most zeolites are three-dimensional crystals with a crystal size in the range of 0.1 to 30 $\mu$m. Heating these zeolites to high temperatures results in the loss of the water of hydration, leaving a crystalline structure with channels of molecular dimensions, offering a high surface area for the adsorption of inorganic or organic molecules. Adsorption of these molecules is limited by the size of the zeolite channels. The rate of adsorption is limited by the laws of diffusion.

One limitation on the utilization of these zeolite crystals is their extremely fine particle size. Large naturally-formed agglomerates of these crystals break apart easily. Because the pressure drop through the bed is prohibitively high, these zeolite crystals cannot be used in fixed beds for various dynamic applications, such as drying of natural gas, drying of air, separation of impurities from a gas stream, separation of liquid product streams and the like. Therefore, it is desirable to agglomerate these crystals with other materials to provide an agglomerate mass of the crystals which exhibits a reduced pressure drop.

To permit the utilization of these molecular sieve crystals, different types of clays are used as binders including attapulgite, palygorskite, kaolin, sepiolite, bentonite, montmorillonite and mixtures thereof. For example, U.S. Pat. No. 2,973,327 discloses the use of a number of different types of clays, including attapulgite, as a binder for molecular sieves. The clay content of the bonded molecular sieve can vary from as low as 1 percent to as high as 40 percent by weight, although the preferred range is from about 10 to about 25 percent by weight.

U.S. Pat. No. 3,219,590 discloses another molecular sieve blend comprising a kaolin-type clay and a lignosulfonate which functions as the binding agent.

Adsorbent materials comprising a type 5A zeolite molecular sieve and a kaolin clay binder, wherein the kaolin comprise from about 10 to about 40 percent of the composition, are disclosed in U.S. Pat. No. 5,001,098.

Molded bodies containing dealuminated zeolite Y and a binder material are disclosed in U.S. Pat. No. 5,316,993.

An adsorbent and/or catalyst blended with a binder system comprising a colloidal metal oxide, an oxide adsorbent and an acid are disclosed in U.S. Pat. No. 5,948,726.

An adsorbent for separating gases comprising a binder and a crystalline, low silica faujasite-type zeolite with a silica to alumina molar ratio of 1.9 to 2.1 is disclosed in EP 0 940 174 A2. This reference discloses the blending of a zeolite with a conventional, dense attapulgite clay binder useful for the separation of gases. The bulk density of the binder is not disclosed.

Another blend of a conventional, dense attapulgite clay binder with a zeolite is disclosed in U.S. Pat. No. 5,413,978. The bulk density of the attapulgite clay is from about 400 g/l to about 530 g/l.

An abrasion-resistant granular zeolite formed by blending a zeolite and a binder system is disclosed in U.S. Pat. No. 4,420,419. See also U.S. Pat. No. 5,292,360 which discloses an adsorbent for the purification of gases comprising a 5A zeolite molecular sieve and a kaolin clay binder.

One problem with conventionally formed zeolite blends is decreased diffusion. The larger the diameter of the formed zeolites, the slower the rate of diffusion of the molecules to be adsorbed. Particularly in the field of pressure swing adsorption, this effect is highly adverse to short cycle time and thus to productivity. Enhanced kinetic values or faster mass transfer rates can result in shorter cycle time and lower power consumption and thus higher adsorbent productivity.

It has been recognized that a reduction in the particle size of formed zeolites leads to shorter mass transfer zones and shorter cycle times. This is based on the assumption that the time needed for adsorbates to travel through the macropores of the adsorbents limits the cycle time, i.e. macropore diffusion is the rate limiting step in these processes. This problem can be improved by adding pore forming compounds to the zeolite clay blend before the forming step.

Accordingly it is an object of the invention to disclose a process for the preparation of molecular sieve adsorbents with enhanced diffusion rates.

It is a still further object of the invention to disclose a process for the production of a molecular sieve adsorbent blend which is especially useful in thermal swing adsorption (TSA) systems and in pressure swing adsorption (PSA) systems.

It is a still further object of the invention to disclose molecular sieve adsorbent blends which maintain their physical properties and diffusion capabilities even with reduced binder percentages.

It is a still further object of the invention to disclose a process for the production of a molecular sieve adsorbent blend utilizing highly dispersed attapulgite fibers.

It is a still further object of the invention to disclose a molecular sieve adsorbent blend comprising a zeolite powder and a highly dispersed attapulgite binder.

It is a still further object of the invention to disclose a process for drying a feed stream comprising passing the feed stream over a molecular sieve adsorbent blend comprising a zeolite and a highly dispersed attapulgite binder.

It is a still further object of the invention to disclose a process for the adsorption of carbon dioxide from an air stream comprising passing that air stream over a molecular sieve adsorbent blend comprising a zeolite powder and a highly dispersed attapulgite binder.

It is still further object of the invention to disclose a process for separation of components of a gaseous or liquid feed stream comprising passing that gaseous or liquid feed stream over a molecular sieve adsorbent blend comprising a zeolite powder and a highly dispersed attapulgite binder.

These and other objects are obtained by the process for production, the process for use and product of the invention disclosed herein.

SUMMARY OF THE INVENTION

The present invention is a process for the production of a molecular sieve adsorbent blend with improved performance characteristics comprising preparing a zeolite, preparing an attapulgite binder containing highly dispersed attapulgite fibers, mixing the zeolite with the attapulgite binder in an aqueous mixture, forming molecular sieve adsorbent products from the mixture, and calcining the adsorbent product to form a molecular sieve adsorbent blend, wherein the tapped bulk density of the highly dispersed attapulgite fibers, is above 550 g/l as measured according to DIN/ISO 787, and wherein the water adsorption capacity of the highly dispersed binder is above 35 percent (w/w).

The present invention is also a molecular sieve adsorbent blend comprising a zeolite blended with a highly dispersed attapulgite binder, wherein the tapped bulk density of the highly dispersed attapulgite binder is above 550 g/l as measured according to DIN/ISO 787, and wherein water adsorption capacity of the highly dispersed binder is above 35 percent (w/w).

The present invention is also a process for drying a feed stream comprising passing the feed stream over a molecular sieve adsorbent blend comprising a zeolite blended with a highly dispersed attapulgite binder as defined above.

The invention is also a process for the separation of components of a gaseous or liquid feed stream comprising passing the liquid feed stream over a molecular sieve adsorbent blend comprising a zeolite blended with a highly dispersed attapulgite binder as defined above.

DETAILED DESCRIPTION OF THE INVENTION

The present invention is a molecular sieve adsorbent blend formed from a zeolite blended with a highly dispersed attapulgite binder and a process for formation of that product. The invention is based on the discovery that the adsorption rate of a molecular sieve product is not only dependent upon the size of the formed zeolite particles, but also the type and characteristics of the binder blended with the zeolite. It has been surprisingly discovered that the same type and quantity of zeolite when blended with different binders produces zeolite blends which exhibit different adsorption characteristics depending upon the binder that is used. The phrase "adsorption rate" or "sorption rate" or "mass transfer rate" means the rate at which an adsorbate loading in a feed stream changes over a given period of time for a given adsorption separation process.

The prior art suggests that the adsorption rate of a molecular sieve adsorbent is only a function of the porosity and particle size of the molecular sieve adsorbent. It has now been surprisingly discovered that the type of binder that is used to bind the zeolite crystals also plays a role in the adsorption rate of the zeolite material.

Adsorbent aggregates or blends are formed by mixing zeolite crystals with binder materials. Various types of zeolites may be used to form the adsorbent blend including zeolite A, zeolite X, zeolite Y, zeolite ZSM-5, zeolite Beta, synthetic mordenite and blends thereof. These zeolites may be used singly or in mixtures of two or more zeolites. Zeolites may be present in their alkali or alkaline earth metal substituted form. The particular type of zeolite present in the blend depends upon the adsorbate that is to be adsorbed from the feed stream. For example, when the desired adsorbent is carbon dioxide in a gas stream, the preferred zeolites include zeolite X or zeolite LSX. When the adsorption process is for the purification of gases, notably by pressure swing adsorption (PSA) and temperature swing adsorption (TSA) methods, the preferred zeolites include zeolite A or zeolite X.

Binder materials are utilized to bind the individual zeolite crystals together, to form shaped products and to reduce the pressure drop during adsorption. However, in the past the binder material has not enhanced the adsorption capability of the zeolite. In fact, conventional binder materials have generally reduced the adsorption capacity of the zeolites. Binder materials which have been utilized with zeolites in the past include clay minerals, such as kaolin, palygorskite-type minerals, such as attapulgite, and smectite-type clay minerals, such as montmorillonite or bentonite. These clay binders have been used singly or in mixtures of two or more different types of clay binders.

The inventors have discovered that a particularly useful blend of zeolites and a clay binder is produced when the clay material is an attapulgite clay which has been "highly dispersed." Generally speaking, clay particles, especially attapulgite clay particles, exist as dense materials with very limited adsorption capabilities. These conventional clay binder particles are different in size and shape from the zeolite particles. When blended with zeolite crystals they tend to occupy space between the zeolite crystals and may assist in the adsorption by the zeolite material without increasing the overall adsorption of the zeolite blend.

In particular, attapulgite clay particles, even after mining and work-up, are naturally formed in the shape of dense bundles of clumped bristles. The existence of these bundles has been confirmed using scanning electron microscopy (SEM). These bristles must be separated or ground to permit their use as binders for zeolite particles. Without grinding these attapulgite clay particles to a smaller size, a non-porous layer of attapulgite clay particles is created in the zeolite blend, preventing or substantially limiting, diffusion of adsorbates through the blend. The conventional attapulgite clays that have been utilized in the past are produced by dry grinding the attapulgite clay. In the conventional process these dry ground attapulgite clay bundles of bristles are then blended with the zeolite crystals. However, even after this conventional grinding of the attapulgite clay bundles, large bundles of attapulgite clay bristles are still present. When these conventional attapulgite clay bundles are blended with zeolite and formed into adsorbents, the capability of the zeolite materials to adsorb the desired adsorbate is not substantially enhanced.

The applicants' invention utilizes "highly dispersed" attapulgite clay as the binder material that is blended with the zeolite powder. The difference between conventional, dense attapulgite clay bundles and the "highly dispersed" attapulgite clay particles of the invention can be differentiated readily through the use of a scanning electron microscopy. Another method to distinguish between conventional dense attapulgite clay and the "highly dispersed" attapulgite clay products of the invention is by the use of tapped bulk density measurement as determined according to DIN/ISO 787. Dense attapulgite clay binders contain a residual water content of about 20–25 percent and have a tapped bulk density of about 400 g/l to about 530 g/l. "Highly dispersed" attapulgite binders also contain residual water of about 20–25 percent but have a tapped bulk density of about 550 g/l to about 700 g/l.

Another method to distinguish between conventional dense attapulgite clay and highly dispersed attapulgite clay products of the invention is by determining the water adsorption capacity of the attapulgite clay products. To determine whether the clay binder is "highly dispersed" the clay binder is fully saturated at 50 percent relative humidity at 25° C. to the point where an equilibrium adsorption capacity is achieved. This process may take up to 72 hours. After full hydration of the clay is achieved the clay is dried at 550° C. for at least two hours. The difference of the weight between the fully hydrated clay and the dried clay is the water adsorption capacity. For dense attapulgite clays, the water adsorption capacity is below 30 percent whereas for the "highly dispersed" attapulgite clay, the water adsorption capacity is above 35 percent.

While any process which produces attapulgite fibers which are "highly dispersed" as defined above is within the scope of the invention, one preferred process is disclosed in U.S. Pat. No. 6,130,179, the contents of which are incorporated by reference into this application. This patent fails to disclose or suggest the use of this highly dispersed attapulgite clay with zeolite. The process of U.S. Pat. No. 6,130,179 utilizes a dispersant which disperses the individual attapulgite particles in water such that they remain in suspension even after other materials, including other clay and mineral species, are removed from that solution. Once the "highly dispersed" attapulgite clay is prepared, it is ready for use in the production of the molecular sieve adsorbent product of the invention.

Generally the process to produce the molecular sieve adsorbent blend product with improved performance characteristics according to the invention is as follows:
prepare the zeolite material,
prepare an attapulgite binder comprising highly dispersed attapulgite fibers,
mix the zeolite with the attapulgite binder in an aqueous mixture,
form an uncalcined material from the mixture, and
calcine the material to form the molecular sieve adsorbent blend product of the invention.

Once the appropriate zeolite material is chosen for a given application, it is mixed with the highly dispersed attapulgite binder in the presence of water. The zeolite powder and the highly dispersed attapulgite binder are blended together with water. The amount of highly dispersed attapulgite binder that is utilized can range from 5 to about 30 percent by weight, preferably from about 5 to about 20 percent and most preferably in the range of about 10 percent of the blend. Conventional mixtures of zeolite and non-highly dispersed attapulgite clay binders utilize about 20 percent or more attapulgite clay. Sufficient water is retained in or added to the mixture to make a formable mixture, i.e., one that can be easily extruded.

The mixture is blended using a conventional blending device, such as a conventional mixer, until a mass of suitable viscosity for forming is obtained. The blended mixture is then formed into the appropriate shaped product, for example, by extrusion. The products can be formed in any conventional shape such as beads, pellets, tablets or other such conventional shaped products. Once the formed products are produced into the appropriate shape, they are calcined, preferably at about 600° C., for about 30 minutes to 2 hours.

In an optional preferred embodiment, a pore forming agent may be added to the zeolite/attapulgite clay mixture during the mixing step to enhance the total pore volume of the end product. Among the acceptable pore forming agents are fibers, including rayon, nylon, sisal, flax and the like and organic polymers, including corn starch, starch derivatives, lignosulfonates, polyacrylamide, polyacrylic acid, cellulose, cellulose derivatives and the like. The amount of the pore forming agent that may be added is from about 2 to about 15 percent, by weight.

Products produced by the process of the invention show improved adsorption rates. The adsorption rate can be determined using several different methods. For example, in one preferred process, the adsorbent product produced according to the invention can be tested to determine the time necessary to achieve 95 percent of the maximum adsorption capacity of the material. The shorter the time to achieve this value, the faster the adsorption rate.

In another process to determine the adsorption rate of the molecular sieve adsorbent blend of the invention, the amount of the adsorbed product that has been adsorbed over a given period of time can be determined.

In a further process of comparison of adsorption, the mass transfer zone of the blend of the invention can be compared to that of a conventional blend under given conditions. The shorter the mass transfer zone, the higher the adsorption rate.

Finally, the diffusion rate can be determined directly for certain gases or liquids. The higher the diffusion rate, the faster the adsorption rate.

It has been surprisingly discovered that by replacing a conventional attapulgite binder with the same quantity of "highly dispersed" attapulgite binder of the invention, there is an improved adsorption rate regardless of which method is used to measure that rate. The improvement in adsorption rate is at least about 10 percent and as high as 200 percent compared to products containing conventional attapulgite clay binders. This improvement is especially important because of the increased cost of the highly dispersed attapulgite binder over conventional attapulgite binders.

A further surprising improvement is in the ability of the zeolite adsorbent blend product to maintain its crush strength even when the amount of the attapulgite binder that are added to the mixture is reduced. Generally speaking, the more binder that is present in the forming process, the better the crush strength for the finished product. For conventional dense attapulgite binders, this improvement in the crush strength is dramatic when the percentage of attapulgite binder within the end product increases from zero to about 20 percent of the composition. Products made with conventional dense attapulgite binder of 10 percent or less are not practical as their crush strength drops below acceptable levels. It has been surprisingly discovered that a product produced using the highly dispersed attapulgite fibers of the invention produces an end product with adequate crush strength even when the quantity of the highly dispersed attapulgite binder in the end product is as low as 10 percent or less. Further, at any particular percentage of binder material, the crush strength of a product produced using the highly dispersed attapulgite fiber of the invention is higher than for a product made with a conventional dense attapulgite binder.

It has also been surprisingly discovered that even when lower percentages of a highly dispersed attapulgite fiber are utilized in an adsorbent product, the rate of water adsorption increases. This is evidenced by a reduction in the amount of time that is necessary to achieve a particular predetermined amount to be adsorbed. This improvement is at least 10 percent and in many cases as much as 30 percent or more.

The highly dispersed attapulgite binder can be blended with zeolite and used for a number of different processes. For example, the blend of highly dispersed attapulgite clay and zeolite can be used for drying a feed stream, such as for the removal of water from a gaseous or liquid ethanol stream. The blend can also be used for the separation of nitrogen from an air stream. Further, the blend can be used for the removal of sulfur and oxygen containing compounds from a hydrocarbon stream. Another use for this blend is for the removal of carbon monoxide, carbon dioxide and nitrogen from a hydrogen gas stream. The blend can also be used for the removal of water from a gaseous or liquid hydrocarbon stream or for the removal of water from a gaseous or liquid stream of refrigerants. Another use is for the removal of water and carbon dioxide from air. The adsorbent material of the invention may also be used for the separation of organic compound, such as for the separation of n-paraffins from a mixture of iso-paraffins and n-paraffins or for the conversion of certain organic compounds. There are a number of other processes for which this blend of a highly dispersed attapulgite clay and zeolite can be utilized which would be well known to a person skilled in the art and which are covered by this invention.

These improvements are shown by the following examples:

EXAMPLES

Example 1

Samples of an attapulgite clay material that is conventionally used as a binder for zeolites and a highly dispersed attapulgite clay material were tested for tapped bulk density, residual water and water adsorption capacity. Tapped bulk density was determined according to DIN/ISO 787. (Actigel 208 obtained from ITC Floridin was used as the highly dispersed attapulgite clay in all examples. The conventional attapulgite clays were of different brands and obtained from ITC Floridin.)

A clay sample of about 10 grams was weighed in a porcelain crucible (weighing precision 1 mg) and heated to 550° C. for 2 hours. The sample was cooled to room temperature in a desiccator and weighed (weighing precision 1 mg). The weight difference led to the residual water amount.

Another clay sample of about 10 grams was weighed in a porcelain crucible (weighing precision 1 mg) and was water saturated at 50 percent relative humidity and 20° C. The equilibrium was reached within 72 hours. The sample was weighed (weighing precision 1 mg) and heated to 550° C. for 2 hours. The sample was cooled to room temperature in a desiccator and weighed (weighing precision 1 mg). The weight difference of the fully hydrated sample and fully dried sample led to the water adsorption capacity given in Table 1 below. The fully dried mass was taken as 100 percent clay.

TABLE 1

| | Attapulgite Clay Sample | | | |
|---|---|---|---|---|
| | Highly Dispersed Clay | Conventional Dense Clay 1 | Conventional Dense Clay 2 | Conventional Dense Clay 3 |
| Tapped Bulk Density (g/ml) | 617 595 660 | 398 + 31 (average of 17 samples) | 529 + 20 (average of 21 samples) | 428 459 |
| Residual Water as Received (%) | 22.3 21.7 23.7 | 25.5 | 21.4 | 25.5 22.6 |
| Water Adsorption Capacity (%) | 36.8 36.0 36.0 | 28.8 | 25.0 | 29.7 28.8 |

As is clear from the Table, the bulk density of the highly dispersed clay was significantly higher than the bulk density of the conventional dense attapulgite clay. In addition, the water adsorption capacity of the highly dispersed attapulgite clay was significantly higher than that of the conventional dense attapulgite clay.

Example 2

The crush strength of samples of a molecular sieve adsorbent blend product prepared using a conventional dense attapulgite clay was compared with a molecular sieve adsorbent blend product prepared using a highly dispersed attapulgite clay.

To determine the crush strength of the various samples, molecular sieve blends were prepared. Sodium A molecular sieve was blended with various amounts of both a conventional dense attapulgite clay and the highly dispersed attapulgite clay. To 100 grams of the molecular sieve/clay binder mixture about 30 to 40 grams of water were added and then blended for up to 180 minutes using a conventional blender. The product was then extruded in the form of 1/16" extrudates. These extrudates were then dried at approximately 120° C. for 8 to 12 hours and then calcined at 600° C. for about 2 hours.

TABLE 2

| | Crush Strength in Relation to the Amount of Binder Used | | | | | |
|---|---|---|---|---|---|---|
| | Conventional Dense Binder (20%) | Conventional Dense Binder (15%) | Conventional Dense Binder (10%) | Highly Dispersed Binder (20%) | Highly Dispersed Binder (15%) | Highly Dispersed Binder (10%) |
| Size of Extrudates | 1/16" | 1/16" | 1/16" | 1/16" | 1/16" | 1/16" |
| Crush Strength [N] | 19.9 | 8.8 | 7.5 | 28.5 | 19.6 | 16.1 |

Surprisingly the crush strength of a product made with 20 percent highly dispersed attapulgite fibers was significantly greater than a product made with the same percentage of a conventional dense attapulgite binder. Further, the crush strength remained at a reasonably high level even when the amount of the highly dispersed attapulgite fiber was reduced to 10 percent, whereas the crush strength of the material using the conventional attapulgite binder dropped rather significantly.

Example 3

Water Adsorption Kinetics

The materials prepared in Example 2 were tested for water adsorption kinetics. It was surprisingly discovered that the amount of binder did not have an impact on the water adsorption kinetics of the material made with the conventional binder. In contrast, it was surprisingly discovered that when the amount of the highly dispersed attapulgite fiber was reduced to 10 percent, the rate of adsorption of water to reach 95 percent of adsorption capacity increased dramatically. Details are shown in the attached Table 3.

TABLE 4

Comparative Results of a Conventional 3A Molecular Sieve and a Molecular Sieve Produced with 10% Highly Dispersed Attapulgite Clay as a Beneficiated Attapulgite Binder

|  | Reference Material (20% Dense Attapulgite Binder) | According to Invention (10% Highly Dispersed Attapulgite Clay) |
| --- | --- | --- |
| Bead Size [mesh] | 4 × 8 | 4 × 8 |
| Crush Strength [N] | 51 | 46 |
| Bulk Density [g/l] | 721 | 687 |
| Water Adsorption 50% r.h. [%] | 20.1 | 21.3 |
| Water Mass Transfer Zone [mm] | 253 | 167 |
| Water Adsorption Kinetic (time to reach 95% ads. capacity; 4 mbar) [min] | 184 | 105 |

TABLE 3

Influence of Binder Type and Binder Amount to Water Adsorption Kinetics

|  | Conventional Dense Binder (20%) | Conventional Dense Binder (15%) | Conventional Dense Binder (10%) | Highly Dispersed Binder (20%) | Highly Dispersed Binder (15%) | Highly Dispersed Binder (10%) |
| --- | --- | --- | --- | --- | --- | --- |
| Size of Extrudates | 1/16" | 1/16" | 1/16" | 1/16" | 1/16" | 1/16" |
| $H_2O$ Adsorption Kinetics at 1 mbar [min] | 121 | 130 | 122 | 136 | 133 | 96 |

Example 4

Beaded Molecular Sieve 3A

A premixed zeolite 3A powder/attapulgite clay composition was added continuously to a granulation pan. The zeolite 3A powder was acquired from CU Chemie Uetikon AG. During the beading process, water was sprayed on the powder mixture to maintain a constant humidity. The powder mixture was added at a speed of 300 kg/hr. After having finished the addition of the powder mixture, the beads were rolled for another 10 minutes. The green beads were dried at 100° C. and then calcined at 600° C. The calcined beads were stored in well closed containers and analyzed. Table 4 gives the comparative results for the two different beaded materials. While physical properties, such as crush strength and bulk density were generally the same for both samples, mass transfer zone was reduced significantly and water adsorption rate was surprisingly faster for the product made with the highly dispersed attapulgite clay.

Example 5

Beaded Molecular Sieve 3A for Natural Gas Drying

A premixed zeolite 3A powder/organic additive/clay composition was added continuously to a granulation pan. During the beading process, water was sprayed onto the powder mixture to keep a constant humidity. The powder mixture was added at a speed of 300 kg/hr. After having finished the addition of the powder mixture, the beads were rolled for another 10 minutes. The green beads were dried at 100° C. and then calcined at 630° C. The calcined beads were stored in closed containers and analyzed. The amount of organic additive was kept constant for both experiments. Table 5 gives the comparative results of the two different beaded materials. While physical properties, attrition, and bulk density are generally the same for both samples, water adsorption rate increased surprisingly for the product produced using the highly dispersed attapulgite clay. The beads are much smaller than in Example 4, but the increase in the adsorption rate was still very high, indicating that the effect is intrinsic.

TABLE 5

Comparative Results of a Conventional 3A Molecular Sieve Used for Natural Gas Drying and a Molecular Sieve Produced with 10% Highly Dispersed Attapulgite Clay as a Beneficiated Attapulgite

| | Reference Material (20% Conventional Dense Attapulgite Binder) | According to Invention (10% Highly Dispersed Attapulgite Clay) |
|---|---|---|
| Bead Size [mesh] | 8 × 12 | 8 × 12 |
| Attrition [%] | 0.04 | 0.02 |
| Bulk Density [g/l] | 730 | 722 |
| Water Adsorption 50% r.h. [%] | 22.2 | 22.7 |
| Water Adsorption Kinetic at $p/p_0 = 0.03$, after 120 min. [%] | 14.1 | 18.5 |

Example 6

Beaded Molecular Sieve 5A

A premixed zeolite 5A powder/clay composition was added continuously to a granulation pan. The zeolite 5A powder was acquired from Zeochem Ltd. During the beading process, water was sprayed onto the powder mixture to keep a constant humidity. The powder mixture was added at a speed of 300 kg/hr. After having finished the addition of the powder mixture, the beads were rolled for another 10 minutes. The green beads were dried at 100° C. and then calcined at 630° C. The calcined beads were stored in closed containers and analyzed. Table 6 gives the comparative results of the two different beaded materials. While butane adsorption capacity increased within expectations, nitrogen adsorption kinetic increased surprisingly, certainly more than was anticipated.

TABLE 6

Comparative Results of a Conventional 5A Molecular Sieve and a Molecular Sieve Produced with 10% Highly Dispersed Attapulgite Clay as a Beneficiated Attapulgite Binder

| | Reference Material (20% Conventional Dense Attapulgite Binder) | According to Invention (10% Highly Dispersed Attapulgite Clay) |
|---|---|---|
| Bead Size [mesh] | 8 × 12 | 8 × 12 |
| N-Butane Adsorption Capacity; 1 bar/25° C. [%] | 8.0 | 9.3 |
| Nitrogen Kinetic Value [l/s] | 0.17 | 0.39 |

Example 7

Beaded Molecular Sieve 4A

The same preparation procedure was used as in Example 6, except that zeolite 4A powder acquired from CU Chemie Uetikon was used for the beading process. The amount of the binder for the new formulation was increased to 15%. The drying and the calcination process followed the same temperature profiles as was used in Example 6. The results are given in Table 7. The Example using 15% of the highly dispersed attapulgite binder showed a surprising improvement in the adsorption rate. The mass transfer zone dropped from 137 mm to 106 mm and the water adsorption capacity after 120 minutes increased from 15.0% to 17.2%.

TABLE 7

Comparative Results of a Conventional 5A Molecular Sieve and a Molecular Sieve Produced with 15% Highly Dispersed Attapulgite Clay as a Beneficiated Attapulgite Binder

| | Reference Material (20% Conventional Dense Attapulgite Binder) | According to Invention (15% Highly Dispersed Attapulgite Clay) |
|---|---|---|
| Bead Size [mm] | 2–3 | 2–3 |
| Crush Strength [N] | 57 | 41 |
| Attrition [%] | 0.03 | 0.01 |
| Bulk Density [g/l] | 729 | 710 |
| Water Mass Transfer Zone [mm] | 137 | 106 |
| Water Adsorption Kinetic at $p/p_0$ (after 120 min.) [%] | 15.0 | 17.2 |

Example 8

Beaded Molecular Sieve 13X Used for Air Purification and/or for Air Separation A premixed zeolite 13X powder/organic additive/clay composition was added continuously to a granulation pan. The 13X zeolite powder was acquired from CU Chemie Uetikon AG. During the beading process, water was sprayed onto the powder mixture to keep a constant humidity. The powder mixture was added at a rate of 500 kg/hr. After having finished the addition of the powder mixture, the beads were rolled for another 10 minutes. The green beads were dried at 100° C. and then calcined at 620° C. The calcined and cooled beads were stored in air tight containers and analyzed. The analytical results of the finished product are given in Table 8. Again, the physical properties remained within expectations, but the adsorption rate increased for the composition of the invention much more than expected, especially for the adsorption of nitrogen.

TABLE 8

Comparative Results of a Conventional 13X Molecular Sieve Used for Air Prepurification and for Air Separation, and a Molecular Sieve Produced with 10% Highly Dispersed Attapulgite Clay as a Beneficiated Attapulgite Binder

| | Reference Material (16% Dense Conventional Attapulgite Binder) | According to Invention (10% Highly Dispersed Attapulgite Clay) |
|---|---|---|
| Bead Size [mm] | 1.0–2.0 | 1.0–2.0 |
| Attrition [%] | 0.05 | 0.07 |
| Bulk Density [g/l] | 640 | 638 |
| Water Adsorption Capacity 50% r.h. [%] | 28.1 | 30.7 |
| $CO_2$ Adsorption Capacity 45 mbar/ 25° C. [%] | 12.6 | 13.6 |
| Water Adsorption Kinetic at $p/p_0 = 0.03$ (after 120 min.) [%] | 17.0 | 19.2 |
| Nitrogen Kinetic Value [l/s] | 0.20 | 0.33 |

As is shown from these examples, there are surprising improvements in the performance of molecular sieve adsorbent blends using attapulgite binder produced from highly dispersed attapulgite fibers. This improvement in crush strength, adsorption kinetics and other characteristics as shown in the Examples was surprising and dramatic.

Although the invention has been described in detail, it is clearly understood that the same is by no way to be taken as a limitation. The scope of the present invention can only be limited by the appended claims.

What is claimed is:

1. A process for separation of components of a gaseous or a liquid feed stream comprising passing the components of the gaseous or liquid feed stream over a molecular sieve adsorbent blend produced by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

2. The process of claim 1 wherein the zeolite product comprises zeolite X or zeolite A.

3. The process of claim 1 wherein the attapulgite binder comprises from about 5 to about 30 percent of the mixture, by weight.

4. The process of claim 1 wherein the attapulgite binder comprises from about 5 to about 20 percent of the mixture, by weight.

5. A process for drying a gaseous feed stream comprising passing the feed stream over a molecular sieve adsorbent blend product comprising a zeolite blended with a highly dispersed attapulgite binder, wherein the tapped bulk density of the highly dispersed attapulgite binder is more than about 550 g/l.

6. The process of claim 5 wherein the zeolite product comprises zeolite X.

7. A process for adsorption of carbon dioxide from an air stream comprising passing the air stream over a molecular sieve adsorbent blend product produced by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

8. The process of claim 7 wherein the zeolite product comprises zeolite X or zeolite Y.

9. A process for removal of water from a gaseous or liquid ethanol stream comprising passing the gaseous or liquid ethanol stream over a molecular sieve adsorbent blend produced by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

10. A process for separation of nitrogen and oxygen from an air stream comprising passing the air stream over a molecular sieve adsorbent blend produced by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

11. A process for removal of sulfur and oxygen containing compounds from a hydrocarbon stream comprising passing the hydrocarbon stream over a molecular sieve adsorbent blend product by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

12. A process for removal of carbon monoxide, carbon dioxide and nitrogen from a hydrogen gas stream comprising passing the hydrogen gas stream over a molecular sieve adsorbent blend produced by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

13. A process for removal of water from a gaseous or liquid hydrocarbon stream comprising passing the gaseous or liquid hydrocarbon stream over a molecular sieve adsorbent blend produced by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

14. A process to separate n-paraffins from a mixture of iso-paraffins and n-paraffins comprising passing the mixture over a molecular sieve adsorbent blend produced by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

15. The process of claim 14 wherein the zeolite product comprises zeolite A.

16. A process for removal of water from a gaseous or liquid stream of refrigerants comprising passing the gaseous or liquid stream over a molecular sieve adsorbent blend produced by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

17. A process for removal of water and carbon dioxide from air comprising passing the air over a molecular sieve adsorbent blend produced by a process comprising preparing a zeolite product;

preparing an attapulgite binder comprising highly dispersed attapulgite fibers;

mixing the zeolite with the attapulgite binder and water to produce a mixture; and forming a molecular sieve adsorbent product from the mixture;

wherein the tapped bulk density of the highly dispersed attapulgite fibers, as measured according DIN/ISO 787, is more than about 550 g/l.

18. The process of claim 17 wherein the zeolit product comprises zeolite X or zeolite Y.

* * * * *